United States Patent
Zahn

(10) Patent No.: US 8,775,333 B1
(45) Date of Patent: Jul. 8, 2014

(54) SYSTEMS AND METHODS FOR GENERATING A THREAT CLASSIFIER TO DETERMINE A MALICIOUS PROCESS

(75) Inventor: Derek Zahn, Boulder, CO (US)

(73) Assignee: Symantec Corporation, Mountain View, CA (US)

( * ) Notice: Subject to any disclaimer, the term of this patent is extended or adjusted under 35 U.S.C. 154(b) by 1025 days.

(21) Appl. No.: 12/542,999

(22) Filed: Aug. 18, 2009

Related U.S. Application Data

(60) Provisional application No. 61/090,315, filed on Aug. 20, 2008.

(51) Int. Cl.
*G06F 15/18* (2006.01)

(52) U.S. Cl.
USPC .............................................. 706/12; 726/24

(58) Field of Classification Search
CPC ........................... G06F 21/566; H04L 63/1416
USPC .......................................................... 706/20
See application file for complete search history.

(56) References Cited

U.S. PATENT DOCUMENTS

| | | | | |
|---|---|---|---|---|
| 7,076,400 | B2 * | 7/2006 | Dulberg et al. ................ | 702/184 |
| 7,370,360 | B2 * | 5/2008 | van der Made .................. | 726/24 |
| 7,877,806 | B2 * | 1/2011 | Repasi et al. ..................... | 726/23 |
| 8,171,545 | B1 * | 5/2012 | Cooley et al. .................... | 726/22 |
| 2003/0200464 | A1 * | 10/2003 | Kidron ........................... | 713/201 |
| 2007/0260880 | A1 * | 11/2007 | Satterlee et al. .............. | 713/164 |
| 2007/0294768 | A1 * | 12/2007 | Moskovitch et al. ............ | 726/24 |
| 2008/0209557 | A1 * | 8/2008 | Herley et al. ..................... | 726/23 |
| 2009/0064334 | A1 * | 3/2009 | Holcomb ......................... | 726/24 |
| 2009/0099988 | A1 * | 4/2009 | Stokes et al. ..................... | 706/20 |

OTHER PUBLICATIONS

Priddy, Kevin L., and Paul E. Keller. Artificial neural networks: an introduction. vol. 68, Chap 5, pp. 31-32. Society of Photo Optical, 2005.*

* cited by examiner

*Primary Examiner* — Li-Wu Chang
*Assistant Examiner* — David H Kim
(74) *Attorney, Agent, or Firm* — Holland & Hart LLP

(57) ABSTRACT

A computer-implemented method for generating a threat classifier is described. A parameter collection module is distributed to a plurality of client processing systems. The module comprises a set of rules to detect a behavior in the client processing systems. If one or more of the set of rules are satisfied, input data indicative of a plurality of client processing parameters is received. The input data is scaled to provide a plurality of parameter vectors. Each of the parameter vectors are classified as a threat or a non-threat. A machine learning process is performed on at least one of the classified parameter vectors. The threat classifier is generated from the machine learning process. The threat classifier is transferred to at least one client processing system. The threat classifier is configured to automatically determine if a process to be performed in a client processing system is malicious.

18 Claims, 6 Drawing Sheets

SYSTEMS AND METHODS FOR GENERATING A THREAT CLASSIFIER TO DETERMINE A MALICIOUS PROCESS

RELATED APPLICATIONS

This application is related and claims priority to U.S. Application No. 61/090,315 filed 20 Aug. 2008 and titled THREAT CLASSIFIER.

TECHNICAL FIELD

The present systems and methods generally relate to methods, systems and/or software for generating and/or using a threat classifier in order to reduce user input to restrict malicious activity being performed by a processing system.

BACKGROUND

Behavior-based threat detection software draws inferences between observed program actions and the maliciousness of the program performing the actions. In some cases, individual actions may not be inherently malicious, and the operating system may allow these actions to be performed in order to be useful in accomplishing legitimate and desirable tasks. Behavior-based threat detection software may therefore make a decision about whether a particular action is likely to be malicious, based on the context of the action.

In some cases, a user may make a decision about whether a particular action should be allowed to execute in the processing system. While placing the burden on the user in this way may remove the responsibility from a security application to determine whether an action is malicious, there are significant downsides to this approach. For example, the process of the user providing a decision as to whether a suspect action can be performed is time consuming and may be considered to be a negative experience by the user. Additionally, users are prone to "dialog fatigue" in that users may become trained to click the simplest button rather than make an educated analysis. Moreover, even when a user attempts to perform an analysis, the user may not be trained in differentiating between an action associated with a threat and an action associated with a legitimate application. As a result, the user's analysis may be considered inaccurate.

In other cases, a white or black list may be generated to determine actions which are considered malicious. The generation of a white or black list may involve the off-line processing of potential threats. The analysis may be performed by human analysts, and the results may be fed back to client machines in the form of pre-approved applications. Threats such as malware, however, can be rapidly modified by the author of the malware. These modifications may hinder the effectiveness of generating a white or black list to determine which actions are considered to be malicious.

Other cases may include restricting events being detected to those events that are malicious. Alternatively, the severity of actions caused by events may be graded in order to help guide the user to a decision. This option, however, is of limited use because many actions performed within the processing system may not be alone inherently malicious. As a result, the context which the action is to be performed within may not be considered.

There is a need, therefore, for a method, system, computer program product, software application, article and/or computer readable medium of instructions for generating a threat classifier to determine a malicious process.

BRIEF SUMMARY

In one embodiment, a computer-implemented method for generating a threat classifier to determine a malicious process is described. A parameter collection module is distributed to a plurality of client processing systems. The parameter collection module includes a set of rules to detect a certain behavior in the plurality of client processing systems. If one or more of the set of rules are satisfied, input data indicative of a plurality of client processing parameters is received from the plurality of client processing systems. The input data is scaled to provide a plurality of parameter vectors indicative of each of the plurality of client processing parameters. Each of the plurality of parameter vectors are classified as a threat or a non-threat. A machine learning process is performed on at least one of the plurality of classified parameter vectors. The threat classifier is generated from the machine learning process. The threat classifier is transferred to at least one of the client processing systems. The threat classifier is configured to automatically determine if a process to be performed in a client processing system is malicious.

In one embodiment, the input data is scaled on float point range of −1.0 to 1.0. The machine learning process may include an Artificial Neural Network (ANN). The plurality of client processing system parameters may be indicative of a history of one or more computer program files on the plurality of client processing systems. In one embodiment, the input data may be received from the client processing systems at different time periods.

The plurality of client processing system parameters may be indicative of dynamic program features executed on the plurality of client processing systems. One or more weights between neurons of the ANN may be adjusted to generate the threat classifier. The set of rules in the parameter collection module may be hard-coded to detect the certain behaviour in the plurality of client processing systems. The threat classifier may generate an output result indicative of a certainty of the classification assigned to a parameter vector associated with a client processing parameter.

A determination may be made as to whether the output result satisfies a certain threshold. If the output result satisfies the threshold, a process may be classified as a threat. If the output result does not satisfy the threshold, additional input from a user may be requested to classify the process.

A server processing system configured to generate a threat classifier to determine a malicious process is also described. The system may include a processor and memory in electronic communication with the processor. The system may be configured to distribute a parameter collection module to a plurality of client processing systems. The parameter collection module may include a set of rules to detect a certain behavior in the plurality of client processing systems. The system may also be configured to receive, from the plurality of client processing systems, input data indicative of a plurality of client processing parameters if one or more of the set of rules are satisfied. The system may be configured to scale the input data to provide a plurality of parameter vectors indicative of each of the plurality of client processing parameters, and classify each of the plurality of parameter vectors as a threat or a non-threat. The system may be further configured to perform a machine learning process on at least one of the plurality of classified parameter vectors, and generate a threat classifier from the machine learning process. The system may also be configured to transfer the threat classifier to at least one of the client processing systems. The threat classifier may be configured to automatically determine if a process to be performed in a client processing system is malicious.

A computer-program product for generating a threat classifier to determine a malicious process is also described. The computer-program product includes a computer-readable medium having instructions thereon. The instructions include code programmed to distribute a parameter collection module to a plurality of client processing systems. The parameter collection module may include a set of rules to detect a certain behavior in the plurality of client processing systems. If one or more of the set of rules are satisfied, the instructions may include code programmed to receive, from the plurality of client processing systems, input data indicative of a plurality of client processing parameters. The instructions may also include code programmed to scale the input data to provide a plurality of parameter vectors indicative of each of the plurality of client processing parameters, and code programmed to classify each of the plurality of parameter vectors as a threat or a non-threat. The instructions may further include code programmed to perform a machine learning process on at least one of the plurality of classified parameter vectors, and code programmed to generate a threat classifier from the machine learning process. In addition, the instructions may include code programmed to transfer the threat classifier to at least one of the client processing systems. The threat classifier may be configured to automatically determine if a process to be performed in a client processing system is malicious.

Other embodiments will be further understood through the following illustrative and non-limitative description.

BRIEF DESCRIPTION OF FIGURES

Example embodiments should become apparent from the following description, which is given by way of example only, of at least one preferred but non-limiting embodiment, described in connection with the accompanying figures.

DETAILED DESCRIPTION

Figure 1:
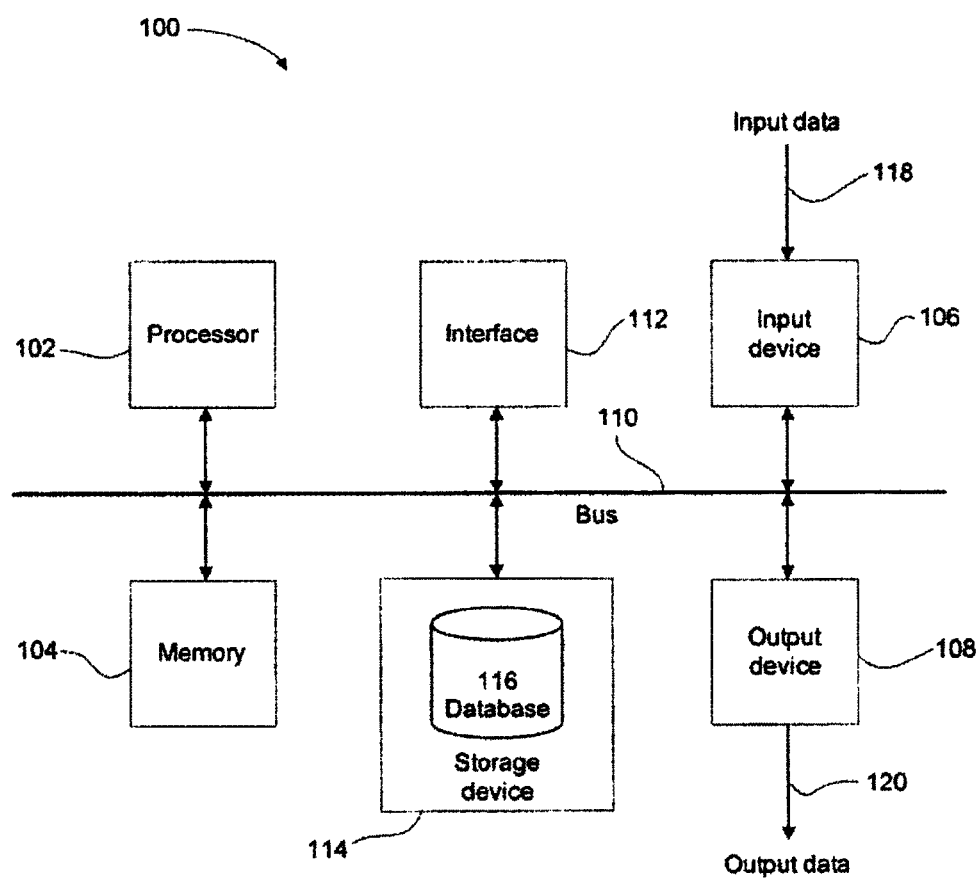
FIG. 1 illustrates a functional block diagram of an example processing system that can be utilised to embody or give effect to a particular embodiment.

In a networked information or data communications system, a user has access to one or more terminals which are capable of requesting and/or receiving information or data from local or remote information sources. In such a communications system, a terminal may be a type of computer, computer system, processing system, computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may include or be associated with other devices, for example a local data storage device such as a hard disk drive or solid state drive.

An information source can include a server, or any type of terminal, that may be associated with one or more storage devices that are able to store information or data, for example in one or more databases residing on a storage device. The exchange of information (i.e., the request and/or receipt of information or data) between a terminal and an information source, or other terminal(s), is facilitated by a communication means. The communication means may be realized by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

The network infrastructure may include devices such as a telephone switch, base station, bridge, router, or any other such specialised network component, which facilitates the connection between a terminal and an information source. Collectively, an interconnected group of terminals, communication means, infrastructure and information sources may be referred to as a network. The network itself may take a variety of forms. For example, it may be a computer network, telecommunications network, data communications network, Local Area Network (LAN), Wide Area Network (WAN), wireless network, Intranetwork. the Internet and developments thereof, transient or temporary networks, combinations of the above or any other type of network providing for communication between computerised, electronic or digital devices. More than one distinct network may be provided, for example a private and a public network. A network as referenced in this specification should be taken to include any type of terminal or other similar type of electronic device, or part thereof, which is rendered such that it is capable of communicating with at least one other terminal.

As used herein a "threat" may include malicious software, also known as "malware" or "pestware", which may include software that is included or inserted in a part of a processing system for a harmful purpose. The term "threat" may include possible, potential, and actual threats. Types of malware may include, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

A hook (also known as a hook procedure or hook function) generally refers to a function provided by a software application that receives certain data before the normal or intended recipient of the data. A hook function can thus examine or modify certain data before passing on the data. Therefore, a hook function may allow a software application to examine data before the data is passed to the intended recipient.

An API ("Application Programming Interface") hook (also known as an API interception), a type of hook, refers to a callback function provided by an application that replaces functionality provided by an operating system's API. An API may refer to an interface that is defined in terms of a set of functions and procedures, and enables a program to gain access to facilities within an application. An API hook may be inserted between an API call and an API procedure to examine or modify function parameters before passing parameters on to an actual or intended function. An API hook may also choose not to pass on certain types of requests to an actual or intended function.

A process may be one of a running software program or other computing operation, or a part of a running software program or other computing operation, that performs a task.

A hook chain may be a list of pointers to special, application-defined callback functions called hook procedures. When a message occurs that is associated with a particular type of hook, the operating system may pass the message to each hook procedure referenced in the hook chain, one after the other. The action of a hook procedure may depend on the type of hook involved. For example, the hook procedures for some types of hooks may only monitor messages, others may modify messages or stop their progress through the chain, restricting them from reaching the next hook procedure or a destination window.

A kernel may refer to the core part of an operating system, responsible for resource allocation, low-level hardware interfaces, security, etc.

An interrupt may be a signal to a processing system that stops the execution of a running program so that another action can be performed, or a circuit that conveys a signal stopping the execution of a running program.

A system registry may be a database used by modern operating systems, for example Windows® platforms. The system registry may include information needed to configure the operating system. The operating system may refer to the registry for information ranging from user profiles, to which applications are installed on the machine, to what hardware is installed and which ports are registered.

A hash function (i.e., Message Digest, e.g., MD5) may be used for many purposes, for example to establish whether a file transmitted over a network has been tampered with or contains transmission errors. A hash function may use a mathematical rule which, when applied to a file, generates a hash value, i.e., a number, usually between 128 and 512 bits in length. This number may then be transmitted with the file to a recipient who can reapply the mathematical rule to the file and compare the resulting number with the original number.

An entity may include, but is not limited to, a file, an object, a class, a collection of grouped data, a library, a variable, a process, and/or a device.

An Artificial Neural Network (ANN) is an information processing paradigm that may be inspired by the way biological nervous systems, such as the brain, process information. The key element of this paradigm may be the structure of the information processing system. It may be composed of a large number of highly interconnected processing elements (neurons) working in unison to solve specific problems. ANNs, may be trained by examples. An ANN is configured for a specific application, such as pattern recognition or data classification, through a learning process. ANNs, with their ability to derive meaning from complicated or imprecise data, may be used to extract patterns and detect trends that are too complex to be noticed by either humans or other computational techniques. A trained ANN may be considered to be an "expert" in the category of information that should be analysed. An advantage of ANNs is their high ability to find patterns in highly non-linear problems and their relatively fast evaluation time. An ANN may be described as having three layers, i.e. input neurons, hidden neurons, and output neurons. Every input neuron is connected to all of the hidden neurons, and in turn, every hidden neuron is connected to all of the output neurons.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

A particular embodiment may be realized using a processing system, an example of which is shown in FIG. 1. In particular, the processing system 100 generally includes at least one processor 102, or processing unit or plurality of processors, memory 104, at least one input device 106 and at least one output device 108, coupled together via a bus or group of buses 110. In certain embodiments, input device 106 and output device 108 may be the same device. An interface 112 may also be provided for coupling the processing system 100 to one or more peripheral devices, for example interface 112 may be a PCI card or PC card. At least one storage device 114 which houses at least one database 116 may also be provided. The memory 104 may be any form of memory device, for example, volatile or non-volatile memory, solid state storage devices, magnetic devices, or the like. The processor 102 may include more than one distinct processing device, for example to handle different functions within the processing system 100.

Input device 106 may receive input data 118 and may include, for example, a keyboard, a pointer device such as a pen-like device or a mouse, audio receiving device for voice controlled activation such as a microphone, data receiver or antenna such as a modem or wireless data adaptor, data acquisition card, or the like. Input data 118 may come from different sources, for example keyboard instructions in conjunction with data received via a network. Output device 108 may produce or generate output data 120 and may include, for example, a display device or monitor in which case output data 120 is visual, a printer in which case output data 120 is printed, a port for example a USB port, a peripheral component adaptor, a data transmitter or antenna such as a modem or wireless network adaptor, and the like. Output data 120 may be distinct and derived from different output devices, for example a visual display on a monitor in conjunction with data transmitted to a network. A user may view data output, or an interpretation of the data output, on, for example, a monitor or using a printer. The storage device 114 may be any form of data or information storage means, for example, volatile or non-volatile memory, solid state storage devices, magnetic devices, or the like.

In use, the processing system 100 may be adapted to allow data or information to be stored in and/or retrieved from, via wired or wireless communication means, the at least one database 116 and/or the memory 104. The interface 112 may allow wired and/or wireless communication between the processing unit 102 and peripheral components that may serve a specialised purpose. The processor 102 may receive instructions as input data 118 via input device 106 and may display processed results or other output to a user by utilising output device 108. More than one input device 106 and/or output device 108 may be provided. It should be appreciated that the processing system 100 may be any form of terminal, server, specialised hardware, or the like.

Figure 2:
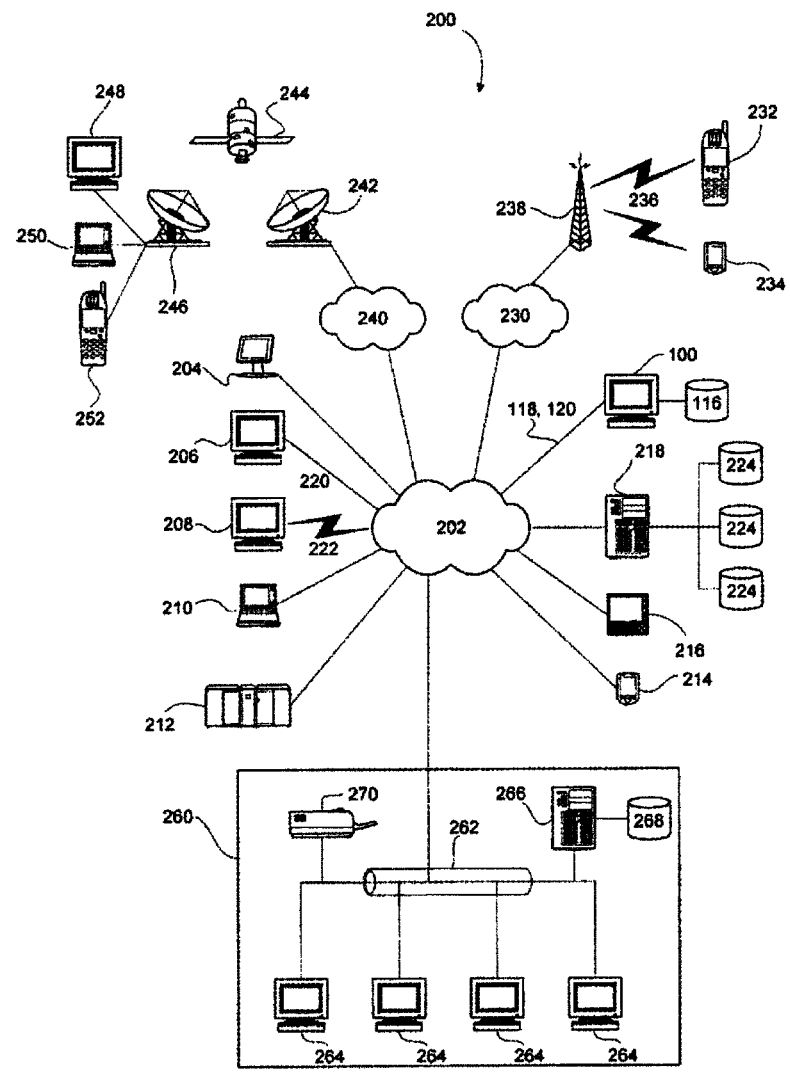
FIG. 2 illustrates an example network infrastructure that can be utilised to embody or give effect to a particular embodiment.

The processing system 100 may be a part of a networked communications system 200, as shown in FIG. 2. Processing system 100 may connect to network 202, for example the Internet or a WAN. Input data 118 and output data 120 may be communicated to other devices via network 202. Other terminals, for example, thin client 204, further processing systems 206 and 208, notebook computer 210, mainframe computer 212, PDA 214, pen-based computer 216, server 218, etc., may be connected to network 202. A large variety of other types of terminals or configurations may be utilized. The transfer of information and/or data over network 202 may be achieved using wired communications means 220 or wireless communications means 222. Server 218 may facilitate the transfer of data between network 202 and one or more databases 224. Server 218 and one or more databases 224 may provide an example of an information source.

Other networks may communicate with network 202. For example, telecommunications network 230 may facilitate the transfer of data between network 202 and mobile or cellular telephone 232 or a PDA-type device 234, by utilizing wireless communication means 236 and receiving/transmitting station 238. Satellite communications network 240 may communicate with satellite signal receiver 242, which receives data signals from satellite 244, which in turn may be in remote communication with satellite signal transmitter 246. Terminals, for example further processing system 248, notebook computer 250 or satellite telephone 252, may thereby communicate with network 202. A local network 260, which for example may be a private network, LAN, etc., may also be connected to network 202. For example, network 202 may be connected with Ethernet 262, which connects terminals 264, server 266, which may control the transfer of data to and/or from database 268, and printer 270. Various other types of networks may be utilized.

The processing system 100 may be adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals, or the like. The networks 202, 230, 240, 260 may be or form part of other communication networks, such as LAN, WAN, Ethernet, token ring, FDDI ring, star, etc., networks, or mobile telephone networks, such as GSM, CDMA or 3 G, etc., networks, and may be wholly or partially wired, including for example optical fibre, or wireless networks, depending on a particular implementation.

Figure 3:
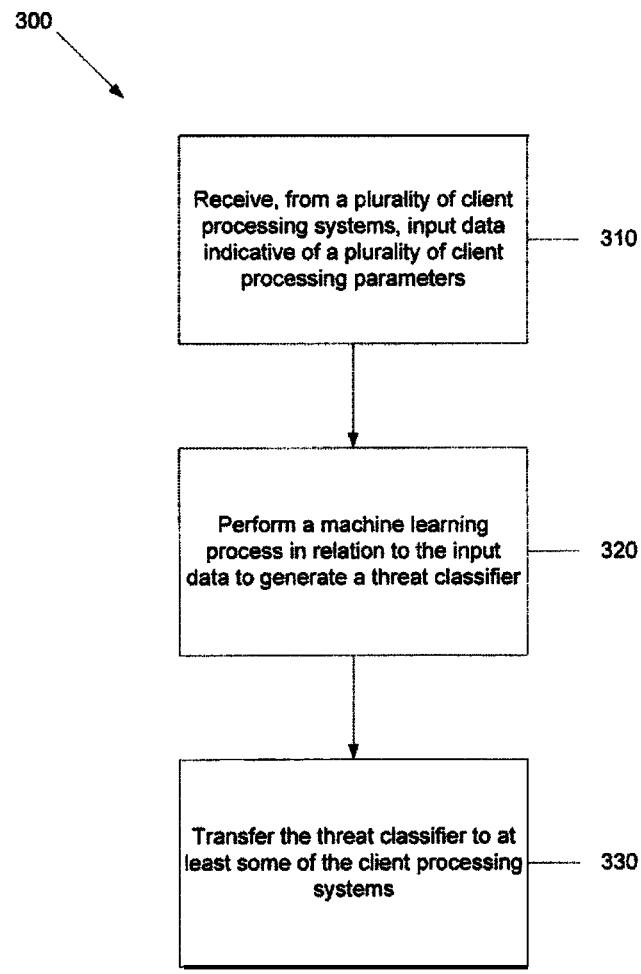
FIG. 3 illustrates a flow diagram of an example method/process providing a particular example embodiment.

Referring to FIG. 3, there is shown a flowchart illustrating one embodiment of a method for generating a threat classifier to reduce user input to determine a malicious process.

In particular, at step 310, the method 300 may include, in a server processing system, receiving, from a plurality of client processing systems in data communication with the server processing system. input data indicative of a plurality of client processing parameters.

At step 320, the method 300 may include performing a machine learning process in relation to the input data to generate a threat classifier. In one embodiment, the threat classifier may determine if a process to be performed in one of the client processing systems is malicious.

At step 330, the method 300 may include transferring the threat classifier to at least one of the client processing systems.

As the threat classifier is generated at a central location (i.e., the server processing system) using input data obtained from a plurality of client processing systems, a highly accurate threat classifier may be generated. Additionally, as the threat classifier is distributed to each client processing system, threats may be determined locally at each client processing system, thereby reducing user input to make a decision as to whether a particular process should be labelled as malicious.

In one embodiment, a server processing system may be provided to perform the method 300. In particular, a server processing system in accordance with processing system 100, may be configured to: receive, from a plurality of client processing systems in data communication with the server processing system, input data indicative of a plurality of client processing parameters; perform a machine learning process in relation to the input data to generate a threat classifier, wherein the threat classifier is configured to determine if a process to be performed in one of the client processing systems is malicious; and transfer the threat classifier to at least one of the client processing systems.

In another embodiment, a computer program product may be provided to configure the server processing system described above to perform the method 300. In particular, the computer program product may include a computer readable medium having a computer program recorded therein or thereon. The computer program may enable generation of a threat classifier to reduce user input to determine a malicious process. The computer program product may configure the server processing system to: receive, from a plurality of client processing systems in data communication with the server processing system, input data indicative of a plurality of client processing parameters; perform a machine learning process in relation to the input data to generate a threat classifier, wherein the threat classifier is configured to determine if a process to be performed in one of the client processing systems is malicious; and transfer the threat classifier to at least one of the client processing systems.

In one embodiment, as will be discussed in more detail in relation to FIG. 6, the machine learning process may be an Artificial Neural Networks (ANN). The ANN may be fed the input data to generate the threat classifier. However, it will be appreciated that other forms of machine learning process may be used including Decision Trees, Naïve Bayes, Bayesian Networks, and the like.

Figure 4:
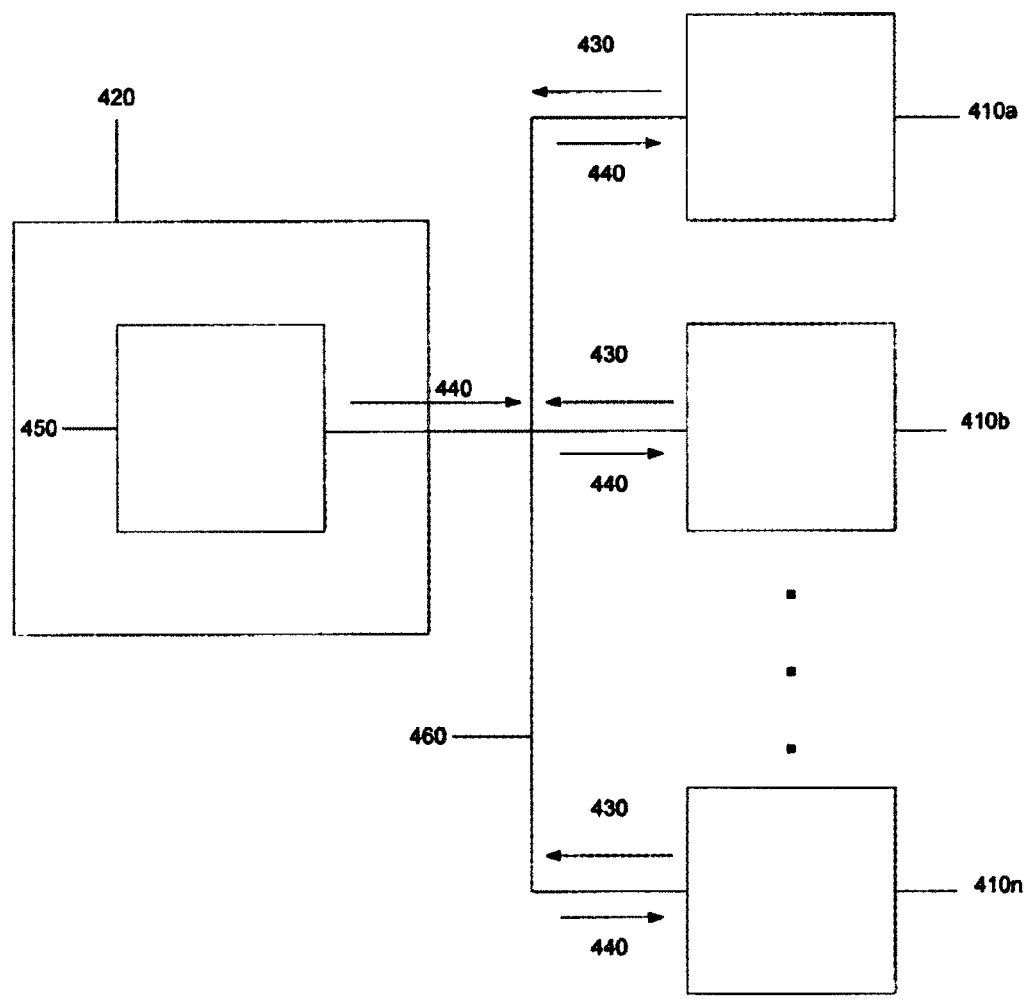
FIG. 4 illustrates a simplified example network infrastructure for generating and using the threat classifier.

Referring to FIG. 4 there is shown a system 400 for generating and using a threat classifier in order to reduce user input to determine a malicious process.

In particular, the system 400 may include a server processing system 420 in data communication with a plurality of client processing systems 410a, 410b . . . 410n. The system may be configured to record, in each of a plurality of client processing systems, input data 430 indicative of a client processing parameters; transfer, from the plurality of client processing systems 410, the input data 430 to a server processing system 420; perform, in the server processing system 420, a machine learning process 450 in relation to the input data 430 to generate the threat classifier 440. In one embodiment, the threat classifier 440 may be configured to determine if a process to be performed in one of the client processing systems 410 is malicious; transfer, from the server processing system 420 to at least one of the plurality of processing systems 410, the threat classifier 440; and use, in the at least some of the client processing systems 410, the threat classifier 440 to determine if a process to be performed in the respective client processing system 410 is malicious.

Figure 5:
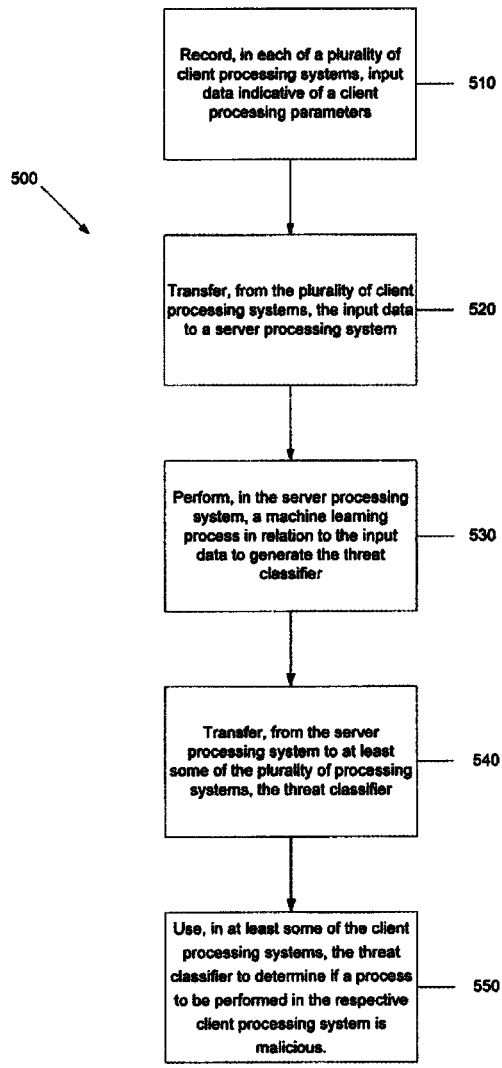
FIG. 5 illustrates a flow diagram illustrating an example method of generating and using the threat classifier.

Referring now to FIG. 5 there is shown a flowchart illustrating a further example of a method 500 for generating and using a threat classifier to reduce user input to determine a malicious process.

In particular, at step 510, the method 500 may include recording, in each of a plurality of client processing systems, input data indicative of client processing parameters. At step 520, the method 500 may include transferring, from the plurality of client processing systems, the input data to a server processing system in data communication with the plurality of client processing systems.

At step 530, the method 500 may include performing, in the server processing system, a machine learning process in relation to the input data to generate the threat classifier. The threat classifier may determine if a process to be performed in one of the client processing systems is malicious.

At step 540, the method 500 may include transferring, from the server processing system to at least one of the plurality of processing systems, the threat classifier. At step 550, the method 500 may include using, in the at least some of the client processing systems, the threat classifier to determine if a process to be performed in the respective client processing system is malicious.

Figure 6:
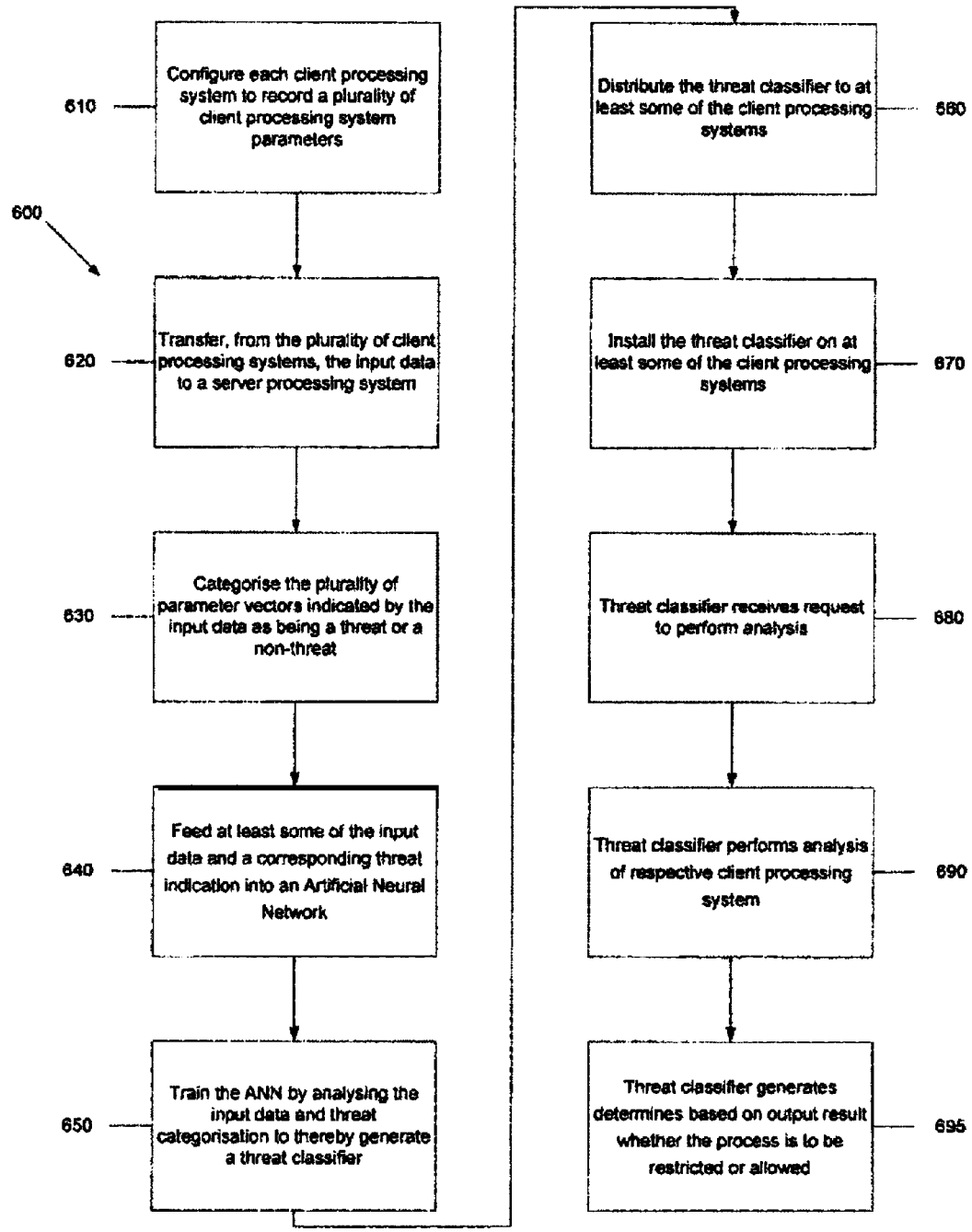
FIG. 6 illustrates a flow diagram of a more detailed example method of generating and using the threat classifier.

Referring to FIG. 6 there is shown a further flowchart illustrating another embodiment of a method for generating and using a threat classifier.

In particular, at step 610 the method 600 may include configuring each client processing system to record a plurality of client processing system parameters. A parameter collection software module may be distributed to each client processing system. The distribution of the parameter collection software module to some of the client processing systems may be performed by the server processing system transferring the software module via the data communications network linking the server processing system with the plurality of processing systems. In other forms, a computer program product including a computer program representing the parameter collection software module may be distributed to users of each client processing system for installation.

The client processing system parameters may be indicative of a history and/or origin of one or more particular entities such as a computer program file. For example, the client processing system parameters may be indicative of when a program was installed and/or how the program file was created. In an additional or alternate form, the client processing system parameters may be indicative of one or more static features of one or more entities such as a computer program file. For example, the client processing system parameters may be indicative of the size of the computer program file, the strings it contains, the folder it is stored in, API calls used by the program, and/or encryption techniques applied to the program file.

In another additional or alternate form, the client processing system parameters may be indicative of dynamic program features. For example, windows which the computer program has created/spawned, interaction with the user, memory and/or resource use, frequency of program execution, and/or how the program was launched.

In another additional or alternate form, the client processing system parameters may be indicative of runtime program activity history. For example, the client processing system parameters may be indicative of network connections made by the program, and/or files accessed by the program.

The parameter collection software module may include a set of rules which detect suspicious behavior which is to occur (i.e., a suspicious process may have been intercepted) or has occurred in the client processing system. In the event that one or more of rules are satisfied, the parameter collection software module may be configured to collect the one or more client processing system parameters. It will be appreciated that while a process is occurring, or about to occur, in a client processing system, the process may be classified as suspicious. In one embodiment, this classification may not necessarily mean that the process is a threat, but rather indicates that an analysis of the process may required to be performed, as will be described in more detail below. The set of rules may be hard-coded to detect suspicious behavior in order to avoid the set of rules requiring dynamic updates, as the machine learning process, to be described in more detail below, performs a more through analysis to determine whether the suspicious behavior can be classified as a threat. The set of hard-coded rules may be provided to detect suspicious behavior as this configuration may simplify the detection process.

At step 620, each client processing system may transfer the input data indicative of the one or more client processing system parameters to the server processing system. Each processing system may transfer the input data at different time periods. In one embodiment, there may be more than one server processing system to receive the input data. However, it will be appreciated that the system may include more client processing systems than server processing systems in order to utilize the input data and resources effectively.

In an alternate embodiment, each client processing system may be scheduled to transfer the input data at a particular point in time to the server processing system. In particular, in order to spread the transfer of the input data to the server processing system over a period of time, each client processing system may be scheduled to transfer the input data at different time periods.

Each client processing system may scale the input data which is indicative of the respective client processing system parameters. In particular, the parameters may be scaled on a float point range of −1.0 to 1.0. Due to the scaling, the input data may be provided in the form of a parameter vector, which are indicative of scaled parameters from each client processing system. For particular parameters, there may be clustering about a particular portion of the range. In one embodiment, a logarithmic scale may be used to map the parameter to the above-mentioned range, therefore providing a more distinguishable spread of the more common parameter measurements along the range.

It will be appreciated that the scaling process may be performed at the server processing system, at each client processing system, or at the client processing system and the server processing system.

At step 630, the method 600 may include categorising the plurality of parameter vectors indicated by the input data as being a threat or a non-threat. This may be performed using human analysis or automatic methods already used in the art.

At step 640, the method 600 may include feeding at least some of the input data, and a corresponding indication as to whether the at least some of the input data was categorised as being a threat or a non-threat, into an Artificial Neural Network (ANN).

At step 650, the ANN may be trained by analysing the input data, and adjusting one or more weights between neurons of the ANN to generate a threat classifier. A back-propagation algorithm, may be used to adjust the weights of links between neurons. The threat classifier may be provided in the form of a statistic model that is capable of distinguishing a threat from a non-threat based on the captured client processing parameters. The threat classifier may be configured to generate an output result indicative of a certainty of the classification. In an optional form, the output result may be indicative of a percentage.

At step 660, the threat classifier may be distributed to at least some of the client processing systems. In one form, the distribution may be via the data communications network which links the server processing system to the plurality of client processing systems. The threat classifier may be provided in the form of a software package or module which is installable by each client processing system which receives the threat classifier.

At step 670, the threat classifier received by each client processing system may be installed.

At step 680, the threat classifier may receive a request to perform an analysis of the respective client processing system to determine whether a particular process is malicious. In one form, an API interception may be used to intercept a particular process commonly used by threats to inflict malicious activities. The API interception module may send the request to the threat classifier to provide a determination as to whether the intercepted process, in the context of the one or more client processing parameters, could be considered a threat.

At step 690, the threat classifier may perform the analysis by collecting the input data indicative of the one or more client processing parameters of the respective client processing system, scaling the input data as previously described, and feeding the input data to the ANN to obtain an output result.

At step 695, if the output result threat classifier indicates that the intercepted activity, in context of the one or more parameters of the client processing system, is likely to be malicious, the ANN may send an instruction to the API interception module to restrict the process from progressing along the hook chain, thereby restricting the threat. As the decision to classify the process as being a threat is performed automatically by the threat classifier without further user intervention, user input is reduced.

In one form, the output result may be compared to a certainty threshold to determine whether a particular decision can be made automatically without further user intervention. In one embodiment, in the event that the certainty threshold is 75%, an output result of 75% or above may indicate that the intercepted process may be considered a threat and may be restricted as described above. In one configuration, if the certainty threshold is less than 75%, user intervention may still be required.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for generating a threat classifier to determine a malicious process, comprising:
   distributing a parameter collection module from a server to a plurality of client processing systems, wherein the parameter collection module comprises a set of rules to detect a certain behavior in the plurality of client processing systems;
   if one or more of the set of rules are satisfied, receiving at the server, from the plurality of client processing systems, input data indicative of a plurality of client processing parameters, wherein each client processing system responds automatically upon determining the one or more of the set of rules are satisfied;
   scaling the input data to provide a plurality of parameter vectors indicative of each of the plurality of client processing parameters;
   classifying each of the plurality of parameter vectors as a threat or a non-threat;
   performing, at the server, a machine learning process on at least one of the plurality of classified parameter vectors;
   generating the threat classifier from the machine learning process, wherein the threat classifier is configured to generate an output result, the output result comprising a single value generated for a single process;
   determining if the output result satisfies a certain threshold, wherein if the output result satisfies the threshold, classifying a process as a threat, and wherein if the output result does not satisfy the threshold, requesting additional input from a user; and
   transferring the threat classifier to at least one of the client processing systems, wherein the threat classifier is configured to automatically determine if a process to be performed in a client processing system is malicious.

2. The method of claim 1, further comprising scaling the input data on float point range of −1.0 to 1.0.

3. The method of claim 1, wherein the machine learning process comprises an Artificial Neural Network (ANN).

4. The method of claim 1, wherein the plurality of client processing system parameters are indicative of a history of one or more computer program files on the plurality of client processing systems.

5. The method of claim 1, further comprising receiving the input data from the client processing systems at different time periods.

6. The method of claim 1, wherein the plurality of client processing system parameters are indicative of dynamic program features executed on the plurality of client processing systems.

7. The method of claim 3, further comprising adjusting one or more weights between neurons of the ANN to generate the threat classifier.

8. The method of claim 1, wherein the set of rules in the parameter collection module are hard-coded to detect the certain behaviour in the plurality of client processing systems.

9. The method of claim 1, wherein the output result indicates a certainty of the classification assigned to a parameter vector associated with a client processing parameter.

10. A server processing system configured to generate a threat classifier to determine a malicious process, comprising:
a processor;
memory in electronic communication with the processor;
instructions stored in the memory, the instructions executable by the processor to:
distribute a parameter collection module from a server to a plurality of client processing systems, wherein the parameter collection module comprises a set of rules to detect a certain behavior in the plurality of client processing systems;
if one or more of the set of rules are satisfied, receive at the server, from the plurality of client processing systems, input data indicative of a plurality of client processing parameters, wherein each client processing system responds automatically upon determining the one or more of the set of rules are satisfied;
scale the input data to provide a plurality of parameter vectors indicative of each of the plurality of client processing parameters;
classify each of the plurality of parameter vectors as a threat or a non-threat;
perform, at the server, a machine learning process on at least one of the plurality of classified parameter vectors;
generate the threat classifier from the machine learning process, wherein the threat classifier is configured to generate an output result;
determine if the output result satisfies a certain threshold, wherein if the output result satisfies the threshold, classifying a process as a threat, and wherein if the output result does not satisfy the threshold, requesting additional input from a user; and
transfer the threat classifier to at least one of the client processing systems, wherein the threat classifier is configured to automatically determine if a process to be performed in a client processing system is malicious.

11. The system of claim 10, wherein the machine learning process comprises an Artificial Neural Network (ANN).

12. The system of claim 10, wherein the plurality of client processing system parameters are indicative of a history of one or more computer program files on the plurality of client processing systems.

13. The system of claim 10, wherein the instructions are executable by the processor to:
receive the input data from the client processing systems at different time periods.

14. The system of claim 10, wherein the plurality of client processing system parameters are indicative of dynamic program features executed on the plurality of client processing systems.

15. The system of claim 11, wherein the instructions are executable by the processor to:
adjust one or more weights between neurons of the ANN to generate the threat classifier.

16. The system of claim 10, wherein the set of rules in the parameter collection module are hard-coded to detect the certain behaviour in the plurality of client processing systems.

17. The system of claim 10, wherein the output result indicates a certainty of the classification assigned to a parameter vector associated with a client processing parameter.

18. A computer-program product for generating a threat classifier to determine a malicious process, the computer-program product comprising a non-transitory computer-readable medium storing instructions thereon, the instructions executable by the processor to:
distribute a parameter collection module from a server to a plurality of client processing systems, wherein the parameter collection module comprises a set of rules to detect a certain behavior in the plurality of client processing systems;
if one or more of the set of rules are satisfied, receive at the server, from the plurality of client processing systems, input data indicative of a plurality of client processing parameters, wherein each client processing system responds automatically upon determining the one or more of the set of rules are satisfied;
scale the input data to provide a plurality of parameter vectors indicative of each of the plurality of client processing parameters;
classify each of the plurality of parameter vectors as a threat or a non-threat;
perform, at the server, a machine learning process on at least one of the plurality of classified parameter vectors;
generate a threat classifier from the machine learning process, wherein the threat classifier is configured to generate an output result;
determine if the output result satisfies a certain threshold, wherein if the output result satisfies the threshold, classifying a process as a threat, and wherein if the output result does not satisfy the threshold, requesting additional input from a user; and
transfer the threat classifier to at least one of the client processing systems, wherein the threat classifier is configured to automatically determine if a process to be performed in a client processing system is malicious.

\* \* \* \* \*